June 13, 1933. G. E. ROWE 1,914,169
MANUFACTURE OF BLOWN GLASSWARE
Filed Jan. 4, 1929 2 Sheets-Sheet 2
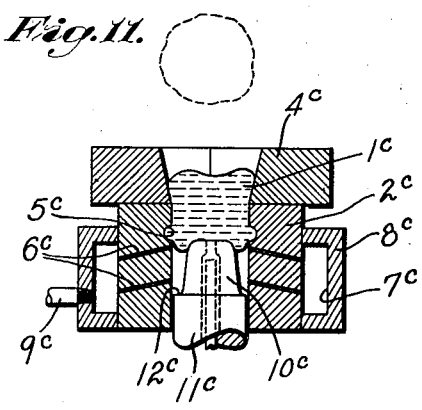
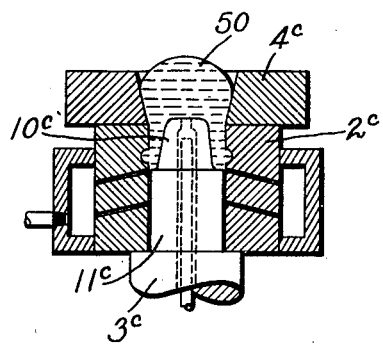
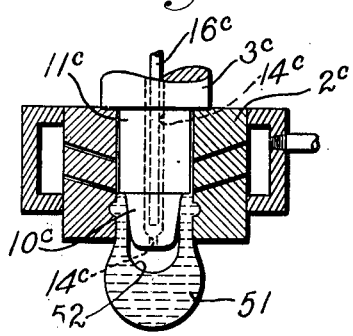
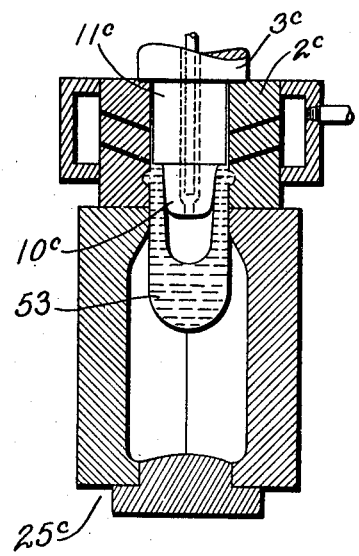
Inventor:
George E. Rowe Patented June 13, 1933

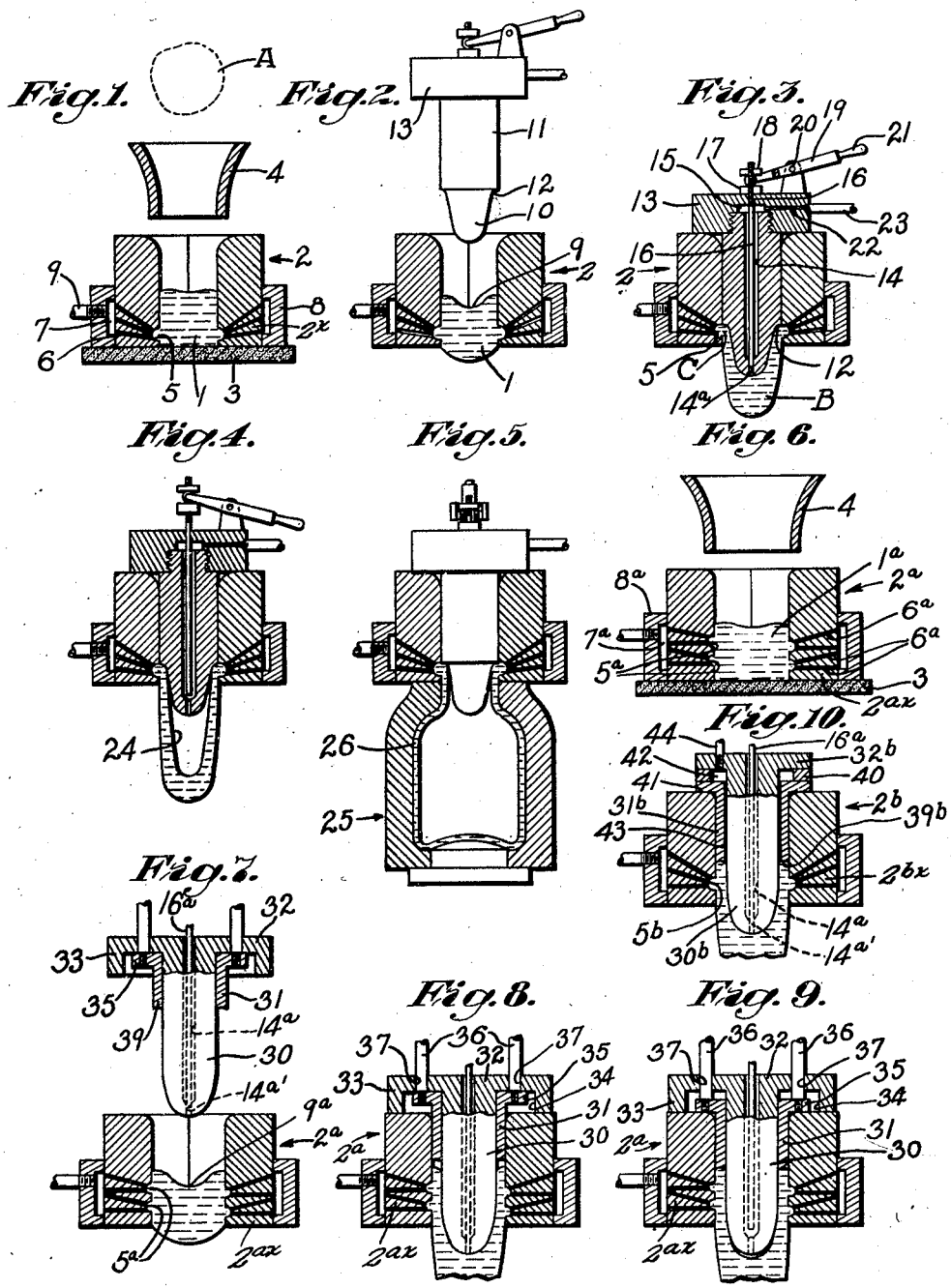

1,914,169

UNITED STATES PATENT OFFICE

GEORGE E. ROWE, OF WEST HARTFORD, CONNECTICUT, ASSIGNOR TO HARTFORD-EMPIRE COMPANY, OF HARTFORD, CONNECTICUT, A CORPORATION OF DELAWARE

MANUFACTURE OF BLOWN GLASSWARE

Application filed January 4, 1929. Serial No. 330,227.

My invention relates generally to the manufacture of hollow glassware, and more particularly to the manufacture of articles of glassware having finished neck or rim portions, such as bottles, fruit jars, etc., as distinguished from articles of glassware having unfinished neck portions, such as bulbs.

The invention is particularly well adapted for use in the manufacture of articles of hollow glassware having relatively wide finished neck or rim portions.

In making articles of hollow glassware having relatively wide neck or rim portions, it is customary to deposit a preformed and generally somewhat thick and compact mold charge in a parison mold that is closed at its lower end. A pressing plunger then is caused to descend into the charge in the parison mold and glass of the charge is forced by hydraulic pressure upwardly along the plunger into the upper portion of the parison mold and forms the neck or rim portion of the article being made. Subsequently, the parison is removed and blowing pressure is introduced into the parison to expand the parison to final form in a finishing mold which has been closed about the parison. In the manufacture of hollow glassware in this manner the charge ordinarily only partly fills the parison mold and different portions of the parison are made from unequally chilled glass. For example, as the pressing plunger descends in the glass in the parison mold, the glass that is forced upwardly by hydraulic pressure to form the neck portion of the article being made will be chilled in a different manner and to a different extent than the glass that remains in the lower closed portion of the parison mold.

Such unequal chilling of different portions of the glass tends to cause the formation of a "skin" of different thickness at different portions of the inner and outer walls of the article being formed and renders uniform distribution of glass to all parts of the walls of the article being formed difficult, if not practically impossible of attainment. Moreover, the action of the pressing plunger in the closed parison mold may result in excessive pressure on portions of the glass, which also will tend to impair the quality of the finished article.

An object of the present invention is to improve methods of and apparatus for forming hollow articles of glassware of the type described by providing for coaction of a pressing plunger with part of a glass charge in an annular mold so as to form the neck portion or finish of the article being made and to provide a preliminary cavity in the glass for the reception of blowing pressure fluid without causing hydraulic pressure on the glass and without subjecting any portion of the glass to excessive pressure.

A further object of the invention is to simplify and improve methods of and apparatus for manufacturing hollow glass articles of the character described by eliminating certain of the intermediate steps which have seemed necessary prior to the present invention and which have required the use of instrumentalities that contribute to the unequal chilling of the glass in different portions of the article being made.

A still further object of the invention is to improve the manufacture of articles of hollow glassware of the type described by providing novel combinations of steps and making use of apparatus which will result in the production in a relatively short time of practically perfect articles of blown glassware having walls which are substantially uniform in thickness throughout all portions of such articles.

In carrying out the invention, I may dispense with the use of a parison mold, such as commonly has been employed prior to the invention, and may provide for the delivery of a suitable preformed and separated charge of molten glass into an open ended annular receptacle, the lower end portion of which constitutes a neck mold. In order to prevent the molten glass charge from falling through the receptacle, a temporary support or stop for such charge may be provided at the lower end thereof to check or stop the downward movement of the charge in the receptacle until portions of the glass enter the neck finish groove or grooves in the walls of a portion of the neck mold portion thereof. Suction may be employed in such grooves to facilitate the entrance of glass thereinto, and to aid in holding the glass for the neck finish of the article in the neck mold, particularly after the bottom stop has been removed. Such bottom stop may be removed as soon as the suction is effective to draw glass into the neck finish grooves and a plunger then is caused to descend into the glass in the receptacle to cooperate with the inner walls of the neck mold to form the neck finish or portion of the article being made and to force the remainder of the glass of the charge longitudinally of the receptacle so that glass for the body of the article being made will project from the neck mold portion thereof. When the receptacle is in upright position at the time the mold charge is delivered thereto, as contemplated by one method of carrying out the present invention, the temporary bottom stop or support for the mold charge may be a plate of material having a minimum chilling effect on the glass, such as brush carbon, and to which the glass will not stick when the support or stop is relatively hot. The groove or grooves in the inner wall of the neck mold are for forming beads or threads on the neck finish or portion of the article being made and preferably will be disposed well toward the lower end of the receptacle when the latter is upright. The temporary support or stop may be removed almost instantly if suction is employed to hold glass in the neck mold and part of the glass may be permitted to sag somewhat from the lower end of the upright receptacle before the plunger is moved downward into the glass therein. However, if suction should not be employed, the temporary support or stop preferably will be retained in contact with the lower end of the glass charge until just before the plunger enters the glass as it is then desirable that the neck finish be permitted to set as much as practicable before the plunger enters the glass. The adhesion of the glass to the wall of the neck mold and the engagement of the glass with the groove in the inner wall of the mold then are depended on to prevent the downward movement of the plunger from pulling from the neck mold the glass that forms the neck finish or portion of the article being made. In either event, after the plunger has reached the limit of its downward movement, at which time it may project somewhat from the lower end of the receptacle, pressure fluid is applied through said plunger to the interior of the glass to puff or blow the depending bare glass to a shape which corresponds somewhat to that of a counterblown parison such as is formed according to methods employed prior to the present invention. However, such partially blown glass has not been subjected to such inequalities as to temperature conditions, chilling contacts, etc., as the glass of the parison of the commonly employed methods but on the contrary the portion of the glass that will form the surface of the body of the article has been uniformly chilled because of its contact with the removable bottom plate or stop. Consequently, the blowing of the bare glass below the neck mold according to the present invention may be so regulated with due regard to the tendency of molten glass to sag downward in suspension, and to the action of glass to form a skin thereon when subjected to a temperature different from that of the glass, so that the thickness of the walls of the partially blown article may be so regulated that such partially blown article may be subsequently expanded by blowing pressure in a finishing mold to produce a finished article having walls of approximately equal thickness in all parts thereof.

As a variation, the neck mold may be separate from the remainder of the receptacle and may be inverted at the time of the delivery of a mold charge to the receptacle, somewhat as a parison mold is inverted in the manufacture of glassware according to methods of forming narrow-neck ware, and the temporary support may be provided by projecting the pressing plunger from below upwardly into the neck mold. The contact of the upper end of the pressing plunger with the lower end of the charge in the neck mold will stop or retard the downward movement of the charge in the neck mold so that glass of the charge will enter the groove or grooves in the inner wall of the neck mold. Suction may be employed in the neck mold to facilitate the entrance of glass into the grooves of the neck mold. The plunger then is moved upward in the glass in the neck mold to cooperate with the inner wall of the neck mold in forming the neck finish or portion of the article being made and in forcing part of the glass of the charge upwardly from the neck mold. Suction may be employed during this movement of the plunger to its projected position to aid in holding the glass of the neck finish in the neck mold and the neck mold and the plunger then may be reverted so that the neck mold is in an upright position and the portion of the glass which will form the body of the article being made is pendant below the neck mold. Pressure fluid then is admitted through the plunger and a finishing mold is closed about the pendant glass to permit performance of the remaining steps necessary for the production of the finished article.

It will be observed that the glass will not be subjected to hydraulic pressure or, in other words, part of the glass charge will be unconfined and free to move longitudinally of the neck mold during the formation of the neck finish or portion of the article being made when the invention is performed according to either of the methods just described.

Other objects and advantages of the invention will be apparent from the following more detailed description when it is considered in conjunction with the accompanying drawings, in which:

Figures 1 to 5 inclusive are somewhat diagrammatic vertical sectional views, illustrating successive stages in the manufacture of a relatively wide mouthed bottle according to one method embodying the invention and showing such instrumentalities as may advantageously be used in the performance of such method;

Figs. 6 to 9 inclusive are views generally similar to Figs. 1 to 4 inclusive and show slight variations in certain steps of a method generally similar to that illustrated in Figs. 1 to 5 inclusive, showing also somewhat different instrumentalities for carrying out the method;

Fig. 10 is a view similar to Fig. 9 but showing a modified form of apparatus which may be used in lieu of that shown in Figs. 6 to 9 inclusive; and Figs. 11 to 14 inclusive are somewhat diagrammatic vertical sectional views, showing successive steps of a method having many features in common with the methods illustrated in the preceding views but also bearing some relation to methods of forming narrow-neck glassware, and showing apparatus somewhat different from that illustrated in the preceding views.

In Fig. 1, a charge of molten glass is shown at 1 in an upright sectional receptacle 2, the lower end portion of which constitutes a neck mold, indicated at 2x. The charge is prevented from falling through the receptacle by a bottom stop or cover plate 3. The receptacle 2 may be formed of suitable metal, while the bottom stop or cover plate 3 is preferably of brush carbon for the reasons hereinbefore stated. The glass charge 1 preferably was severed after having been preformed in suspension above the upright receptacle and fell from the dotted line position indicated at A through the guide funnel 4 into the receptacle against the bottom stop or cover plate 3. The neck mold portion of the receptacle 2 has an annular groove 5 in its inner wall adjacent to its lower end connected by the narrow passages or ports 6 with an annular suction chamber 7 which may be provided by disposing a jacket number 8 on the neck mold. The suction chamber 7 may communicate through the pipe 9 with any suitable source of suction (not shown) so that the glass in the neck mold portion of the receptacle will be subjected to suction tending to draw part of such glass into the groove 5. The glass in the groove 5 will form part of the neck finish of the article being made and obviously such groove may extend spirally a plurality of times around the inner periphery of the neck mold or a plurality of discontinuous spaced grooves may be provided in the inner wall of the neck mold, or any other type of neck finish may be employed.

In Fig. 2, the bottom stop or cover plate 3 has been removed and is omitted while suction on the glass in the groove 5 may still be continued. A plunger is shown in Fig. 2 in axial alignment with the receptacle 2 and about to enter the upper end thereof. Part of the glass of the charge in the receptacle has sagged somewhat by gravity so that it extends in a rounded mass below the lower end of the neck mold portion thereof while a slight concavity has been formed at 9 centrally of the upper part of the glass charge. The lower end portion or head 10 of the plunger preferably is tapering, as shown, and is of less area in cross section than the glass receiving space within the receptacle while the upper part or body 11 of the plunger preferably is of sufficient area in cross section and of proper cross-sectional configuration to fit closely although slidably in the bore of the receptacle. A shoulder 12 thus is formed between the portions 10 and 11 of the plunger. The plunger is connected at its upper end with a top cover member 13 and the connection of the plunger with the top cover member may be detachable as shown in Fig. 3, so as to permit plungers having lower end portions 10 of individually different shapes and sizes to be used with the same top cover member.

In Fig. 3, the combined plunger and top cover member have been moved downward so that the top cover member rests on the upper end of the receptacle 2 and the plunger has been projected downwardly through the receptacle until the lower end portion 10 of such plunger has engaged the central portion of the glass charge in the receptacle and has forced part of the charge downwardly below the neck mold portion of the receptacle as indicated at B while cooperating with the internally grooved lower end portion of the neck mold 2x to form the remainder of the glass charge into the neck finish or portion C of the article that is being made. It will be observed that the shoulder 12 on the plunger is disposed at this time at the upper edge of the groove 5 in the bore of the neck mold portion of the receptacle and thus cooperates with the wall of the groove 5 to form a rounded bead at the upper edge of the neck finish portion of the article being made and also aids in holding the glass of the neck finish in place in the neck mold. The shoulder 12 may be curved concavely to conform substantially to the vertical sectional configuration of the walls of the groove 5. The suction on the glass of the neck finish may have been continued while the plunger moved downward from the position shown in Fig. 2 to the position shown in Fig. 3. This plunger may have a central bore 13 having a reduced lower end portion 14 and having communication at the upper end of the plunger with a chamber or space 15 in the top cover member. A valve rod 16 extends loosely through the relatively large part 14 of the bore of the plunger and has its lower end portion disposed in the reduced lower end portion 14a of the plunger bore so as to close the latter. The upper end of the valve rod 16 projects through an opening 17 in the top cover member 3 at the top of the chamber 15 and may be threaded for engagement with a pair of spaced nuts 17 and 18 respectively. The lower nut 17 cooperates with the top cover member 3 to limit the downward movement of the valve rod 16 in the bore of the plunger. Forks at one end of a valve rod operating lever 19, which is fulcrumed at 20 on an upstanding lug on the top cover member 3, embrace the upper end portion of the valve rod between the nuts 17 and 18. The lever 19 has a handle 21 at its outer end which may be gripped and the lever thus conveniently actuated to positively raise or lower the valve rod in the bore of the plunger. The chamber 15 communicates through a port 22 with a pipe 23 which may be connected with any suitable source of pressure fluid supply. The valve rod is in position to close the reduced lower end portion of the bore of the plunger at the time the plunger is moved from the position shown in Fig. 2 to the position shown in Fig. 3. The lever 19 then is actuated to raise the valve rod and pressure fluid is admitted from the chamber 15 through the plunger bore into the interior of the bare glass below the neck mold so as to blow a bubble in such glass substantially as indicated at 24 in Fig. 4. This blowing of the bare glass below the neck mold may be continuous or may be effected by discontinuous puffs. Suction on the glass of the neck finish at the lower end of the neck mold may be continued at this time although such suction probably will not be required to retain the glass of the neck finish in place, as such glass will have set at this time sufficiently to prevent any impairment thereof as the depending glass below the neck mold sags by gravity and is blown to control its shape.

After the pendant glass below the neck mold 2x has attained a desirable shape, which as stated may be controlled by suitable regulation of the blowing pressure and a recognition of the tendency of the glass to sag by gravity while in suspension and to form a skin on its inner and outer walls, a finishing mold unit 25 which may be of any suitable construction and of any suitable material is closed about the pendant partially blown glass below the neck mold. Blowing pressure then is continued or resumed through the plunger to expand the glass in the finishing mold to form the body of the finished article, indicated at 26 in Fig. 5. It is not deemed necessary to illustrate the remaining steps in or relating to the manufacture of the article as it will be understood that the finishing mold unit will be removed from the article after such article has been blown to final form. The article then may be removed from the neck mold in any suitable manner for annealing according to the usual practice.

An article formed according to the method and by the instrumentalities just described may have walls which are substantially uniform in thickness throughout the different portions thereof. This advantageous feature may be obtained because of the novel method steps and the use of the novel combination of instrumentalities hereinbefore described for producing the article. The glass of which the article is formed has been subjected to a minimum of chilling contact with a relatively cool surface, such as the wall of a mold, particularly when the glass was relatively hot as is the case during the formation of the neck finish portion of the article and during the preliminary blowing of the glass which will form the body of the article.

Moreover, inequality of the thickness of the skin formation on different portions of the inner wall and on different portions of the outer wall of the article being formed has been minimized by preventing more adequately than has been possible prior to the present invention unequal chilling of different portions of the glass for different portions of the article.

In addition, excessive pressure on any part of the glass and consequent impairment of quality of the article made of such charge is entirely obviated by reason of the fact that the glass is not subjected to hydraulic pressure nor fully confined while it is relatively hot and molten during the formation of the neck finish or portion of the article.

In Fig. 6, a mold charge 1a is shown in place in an upright receptacle 2a, the lower end portion of which constitutes a neck mold 2ax. The charge is prevented from falling through the receptacle 2a by the bottom stop or cover plate 3a. The funnel 4a is shown above the receptacle and it will be understood that such funnel was employed to direct the charge into the receptacle. The neck mold 2ax has a plurality of grooves 5a in its inner wall, each connected by the narrow passages 6a with an annular suction chamber 7a in a jacket 8a which surrounds the neck mold. Suction may have been employed in the manner hereinbefore described to aid in causing glass from the charge 1a to fill the grooves 5a.

In Fig. 7, the bottom stop or plate 3a has been removed and suction may still be maintained to retain glass in the grooves 5a against the action of the gravity on the remainder of the charge. As a result of the action of gravity, the lower portion of the charge has sagged somewhat below the lower end of the neck mold 2ax and a concavity appears at 9a centrally of the glass in the receptacle. A plunger comprises a body portion 30 which is of less area in cross section than the bore of the receptacle 2a and a sleeve section 31 which is slidable on the body section 30 and is adapted to fit closely, although slidably, in the bore of the receptacle. The body portion 30 of the plunger is shown as being formed integrally with a top cover plate 32, although it may be detachably connected therewith in any suitable known manner. The plunger body has a bore 14a having a reduced lower end portion 14a' controlled by the valve rod 16a. The top cover plate 32 is provided with a depending rim flange 33 for the purpose of providing a space at 34 in Fig. 8 for limited vertical movement of an outturned flange 35 at the upper end of the sleeve section 31 of the plunger when the flange 33 of the top cover plate rests on the upper end of the receptacle as shown in Fig. 8. The movement of the sleeve section 31 along the body section 30 of the plunger may be controlled by operating rods 36 which extend slidably through openings 37 in the top cover plate 32. The lower end of the body section 30 of the plunger preferably is tapering and rounded as shown.

The plunger and the top cover plate are moved as a unit from the position shown in Fig. 7 to the position shown in Fig. 8 while the sleeve section 31 is maintained in its raised position as shown in Fig. 8. This will cause part of the glass charge to be forced downwardly from the neck mold 2ax while the remainder of such charge remains between the body of the plunger and the adjacent portion of the bore of the neck mold to form the neck finish of the article being made. The lower end 39 of the sleeve section 31 of the plunger constitutes a shoulder for engaging with the glass at the upper edge of the neck finish substantially in the manner of the shoulder 12 of the plunger shown in Figs. 2 to 5 inclusive. After the plunger has reached its downwardly projected position shown in Fig. 8, the sleeve operating rods 36 are operated either automatically by any suitable known means, or manually to force the sleeve section 31 downwardly until the shoulder 39 at the lower end of the sleeve section engages the upper edge of the glass between the body of the plunger and the inner wall of the neck mold and shapes such glass to form the upper edge of the neck finish. In order that such upper edge of the neck finish or portion of the article being made may be convexly curved, the lower end of the sleeve section 39 may be slightly concave in cross-sectional configuration. The remaining steps of the method when the apparatus shown in Figs. 6 to 9 inclusive is employed are substantially the same as will be performed with apparatus such as shown in Figs. 1 to 5 inclusive and therefore need not be described.

Fig. 10 shows another form of the combined plunger and top-cover device associated with a receptacle 2b, the lower end portion of which constitutes a neck mold 2bx. The receptacle 2b may be substantially identical in essential respects with the receptacle 2a and therefore need not be specifically described. The combined plunger and top cover device of Fig. 10 has a plunger which comprises a body section 30b that may be similar in all essential respects with the section 30 of the plunger shown in Figs. 7 to 9 inclusive. This section 30b of the plunger is shown as being joined integrally to a top cover plate 32b and as being surrounded by a sleeve section 31b. The sleeve section 31b is fixed against longitudinal movement on the plunger body 30b by means of a connecting and spacing ring 40 between a flange 41 on the upper end of the sleeve 31b and the rim edge portion of the top cover 32b. The arrangement is such as to provide an annular suction space 42 between the upper end of the sleeve section 31b and a portion of the top cover plate 32b, which annular suction space may communicate through a narrow annular passage 43 with the space within the neck mold 2bx below the lower end 39b of the sleeve 31. A pipe 44 may connect the suction passage 42 with any suitable source of suction (not shown). Obviously a plurality of longitudinal passages between the sleeve section 31b and the adjacent portion of the body section 30b of the plunger may be provided in lieu of the annular passage 43. The plunger body 30b is provided with a longitudinal bore 13b extending through the top cover member 32b and having a reduced lower end portion 14b controlled by the vertically movable valve rod 16b.

When the plunger body 30b and the top cover member 32b are moved downward as a unit from a position corresponding to the position of the combined plunger and cover unit of Fig. 7 to the position shown in Fig. 10, the sleeve section 31b of course will be moved downward in the receptacle 2b with the plunger body and suction then may be applied to the glass through the annular passage 43 to draw glass upwardly against the lower end or shoulder 39b of the plunger sleeve and to hold such glass against the shoulder, thus forming the upper edge of the neck finish or portion of the article being made. The suction in the annular passage 43 also will tend to aid the suction on the glass in the groove 5b in the inner wall of the neck mold 2bx to retain the glass of the neck finish or portion of the article in place during the downward movement of the plunger body to the position shown in Fig. 10 and during the subsequent sagging of the glass below the neck mold by gravity and the downward movement or expansion of such glass as a result of the application of blowing pressure thereto. The use of the structure shown in Fig. 10 for the production of a finished article of hollow glassware will be understood without further description in view of the description that has been given as to the use of the forms of apparatus shown in Figs. 1 to 5 inclusive and in Figs. 6 to 9 inclusive.

The invention in its broader aspects may be carried out also by a method which comprises steps and involves the use of structure as illustrated in Figs. 11 to 14 inclusive. In Fig. 11, a neck mold 2c is shown as inverted so that an annular groove 5c in its inner wall for the reception of glass that will form a thread or bead on the neck finish or portion of the finished article is located somewhat nearer to the upper end of the inverted neck mold than to the lower end thereof. The neck mold 2c carries a jacket member 8c which cooperates with the neck mold to define an annular suction chamber 7c which communicates through the narrow ports or passages 6c with the space within the neck mold below the groove 5c. A pipe 9c may connect the suction space 7c with any suitable source of suction, not shown. A glass charge 1c is shown in Fig. 11 as having passed downwardly from the dotted line position shown at X partially through the sectional funnel 4c into the upper end of the inverted neck mold and as having had its fall or downward movement checked or retarded in the upper part of the neck mold by the tapering upper end 10c of a plunger which has a larger portion 11c adapted to fit slidably in the bore of the neck mold. The funnel 4c and the inverted neck mold 2c thus conjointly form a temporary receptacle for the glass charge. Suction may be employed on the glass entering the neck mold to aid in drawing part of the charge downwardly and outwardly around the upper extremity of the reduced portion of the plunger so as to assure expeditious filling of the groove 5c, as shown in Fig. 11. The plunger partially shown in Fig. 11 is connected with a cover plate 3c, shown in Fig. 12, which will contact with the lower end of the inverted neck mold when the plunger and cover plate device is moved upward until the plunger is raised from the position shown in Fig. 11 to the position shown in Fig. 12 to form the neck finish or portion of the article of glassware and to force part of the glass upwardly in the funnel guide 4c above the upper end of the inverted neck mold, as shown in Fig. 12. The bore of the funnel guide 4c may enlarge somewhat toward its upper end so that the raised or upwardly displaced glass of the charge will assume a somewhat bulbous form, as indicated at 50 in Fig. 12, when the plunger is raised. This glass 50 will subsequently form the body of the article of hollow glassware that is being made. Suction from the passages 6c on the glass may be employed to aid in holding glass for the neck finish in place within the inverted neck mold when the plunger is raised and part of such glass will contact with shoulder 12c on the plunger so as to form the edge of the neck portion of the article. The funnel guide 4c then is removed and the neck mold and combined plunger and cover plate device are reverted as a unit from the position shown in Fig. 12 to the position shown in Fig. 13, the portion 50 of glass that was in the funnel guide above the inverted neck mold, as shown in Fig. 12, then sagging downwardly somewhat as shown at 51 in Fig. 13. The plunger has a longitudinal bore 14c having a reduced lower end portion 14c' controlled by a vertically movable valve rod 16c. Blowing pressure is supplied through this longitudinal bore of the plunger so as to blow a bubble 52 in the glass below the upright neck mold, as shown in Fig. 13. The formation of the bubble may be commenced by puff blowing during the reversion of the neck mold and the glass may at the same time be rotated slowly about the axial line of the neck mold as disclosed in my patent Number 1,840,532. The blowing of the bare glass carried by the neck mold may be effected either by continuously applied regulated fluid pressure or by a series of discontinuous regulated puffs until the pendant mass of glass below the upright neck mold has been shaped substantially as indicated at 53 in Fig. 14. A finishing mold unit 25c then is closed about the pendant partially formed glass and the latter may be expanded by pressure applied through the plunger to form the body of the finished article of glassware.

It thus will be apparent that each of the hereinbefore described methods and the use of the various instrumentalities described and illustrated for carrying out such methods permit the formation of the neck finish of the article that is being made and the production of a preliminary aperture or cavity in the glass that will form the body of the article without subjecting such glass to hydraulic pressure and without confining all of such glass against movement longitudinally of the glass receiving mold.

I claim as my invention:

1. The method of forming an article of hollow glassware which comprises dropping a separated charge of molten glass into a vertically disposed open ended receptacle having its lower end portion formed to constitute a neck mold provided with an annular internal groove relatively adjacent to its lower end, stopping the glass from falling through the receptacle by temporarily interposing a stop to the glass, applying suction to the glass to aid in drawing glass into said internal groove and in retaining such glass therein, removing said stop, projecting a pressing plunger having a reduced end portion downwardly through the receptacle to cooperate with the walls of said neck mold to form part of the glass of the charge into the neck portion of the article being made and to force the remainder of the glass of the charge downwardly in suspension from the neck mold, introducing pressure fluid through said plunger into the pendant glass to blow a bubble therein, closing a finishing mold about the pendant glass, and applying pressure fluid through the plunger to blow the body of the article to final form in the finishing mold.

2. Apparatus for forming hollow glassware, comprising an open ended receptacle adapted to receive a charge comprising sufficient molten glass to form a complete article of hollow glassware, the lower end portion of said receptacle constituting a neck mold, said neck mold having an annular groove in its inner wall, a removable stop for temporarily retaining said charge of glass in the receptacle to permit a portion of such glass to enter and engage with said internal groove, and a plunger having a reduced head portion of less area in cross section than the bore of said receptacle and a body portion adapted to fit slidably in said bore, said plunger being movable in said receptacle after said stop has been removed and then cooperating with the neck mold to form the neck portion of said article of glassware and to extrude from the neck mold an unconfined mass of glass for the body of said article.

3. Apparatus for forming hollow glassware, comprising an open ended vertically disposed receptacle, the lower end portion of said receptacle constituting a neck mold having an annular groove in the inner wall thereof, said receptacle being adapted to receive a charge of molten glass of sufficient size to form a desired article of glassware and having means for causing a suction within said internal groove to facilitate entrance of a portion of said glass charge into said groove and to tend to retain said glass charge against falling downwardly through the receptacle, and a plunger having a reduced head portion of less area in cross section than the bore of the receptacle and a body portion adapted to fit slidably in said receptacle, said plunger being adapted to be projected from above downwardly through said receptacle against the glass therein and partially past said annular groove to cooperate with said neck mold and with said suction to form a portion of the glass of said charge into the neck portion of the article of glassware being made and to extrude from the neck mold an unconfined mass of glass for the body of said article of glassware.

4. Apparatus for forming hollow glassware, comprising an open ended vertically disposed receptacle, the lower end portion of said receptacle constituting a neck mold having an annular groove in the inner wall thereof, said receptacle being adapted to receive a charge of molten glass of sufficient size to form a desired article of glassware and having means for causing a suction within said internal groove to facilitate entrance of a portion of said glass charge into said groove and to tend to retain said glass charge against falling downwardly through the receptacle, and a plunger having a reduced head portion of less area in cross section than the bore of the receptacle and a body portion adapted to fit slidably in said receptacle, said plunger being adapted to be projected from above downwardly through said receptacle against the glass therein and partially past said annular groove to cooperate with said neck mold and with said suction to form a portion of the glass of said charge into the neck portion of the article of glassware being made and to extrude from the neck mold an unconfined mass of glass for the body of said article of glassware, said plunger having a passage extending longitudinally thereof through which pressure fluid may be applied to the extruded glass to blow such glass to hollow form.

5. The method of forming an article of hollow glassware which comprises delivering a separated charge of molten glass sufficient for the article to be made downwardly into a substantially vertical open-ended receptacle having its lower end portion formed to constitute a neck mold, temporarily restraining glass of the charge from moving downwardly from said receptacle so as to cause a portion of the glass of the charge to be shaped externally in accordance with the internal contour of said neck mold, and then applying a downwardly acting force axially of the glass in the receptacle to give said externally shaped portion of the glass an internal contour and to force other glass of the charge downwardly from the neck mold into suspension therefrom.

6. The method of forming an article of hollow glassware which comprises delivering a separated charge of molten glass sufficient for the article to be made downwardly into a substantially vertical open-ended receptacle having its lower end portion formed to constitute a neck mold, temporarily restraining glass of the charge from moving downwardly from said receptacle so as to cause a portion of such glass to be shaped externally in accordance with the internal contour of said neck mold, and projecting a pressing plunger having a reduced end portion downwardly through the receptacle into the glass therein to impart an internal contour to glass in the neck mold of sufficient quantity for the neck finish portion of the article being made, and to force the remainder of the glass of the charge downwardly into suspension from the neck mold.

7. The method of forming an article of hollow glassware which comprises delivering a separated charge containing sufficient molten glass for the article desired to an open-ended substantially vertical receptacle having its lower portion formed to constitute a neck mold, temporarily restraining downward movement of glass of the charge in the receptacle to cause a portion of the glass to assume an external shape corresponding with the internal contour of the neck mold portion of the receptacle, and then projecting a pressing plunger axially of the receptacle to impart to the externally shaped portion of the glass an internal contour appropriate for the neck finish of the article desired and to bodily displace the major portion of the glass of the charge a substantial distance longitudinally of the receptacle.

8. The method of forming an article of hollow glassare which comprises delivering a separated charge containing sufficient molten glass for the article desired to an open-ended substantially vertical receptacle having its lower portion formed to constitute a neck mold, temporarily restraining downward movement of glass of the charge in the receptacle so as to cause a portion of the glass to assume an external shape corresponding with the internal contour of the neck mold portion of the receptacle, then projecting a pressing plunger axially of the receptacle to impart to the externally shaped portion of the glass an internal contour appropriate for the neck finish of the article desired and to bodily displace the major portion of the glass of the charge a substantial distance longitudinally of the receptacle, and applying blowing pressure through the projected plunger into the displaced glass to expand such glass.

9. In a method of forming an article of hollow glassware, the steps of depositing a separated charge of molten glass in a receptacle having a lower end portion formed to constitute a neck mold, applying suction to the glass in the neck mold, and applying a downwardly acting force on the axial portion of the glass in the receptacle to form a portion of the glass in the receptacle into the neck finish of the article being made without subjecting the remainder of the glass in the receptacle to hydraulic pressure.

10. In a method of forming an article of hollow glassware, the steps of depositing a separated charge of molten glass in a receptacle having a lower end portion formed to constitute a neck mold, applying suction to the peripheral portion of the glass in the neck mold to aid in forming the neck finish of the article being made, and applying a downwardly acting force axially of the glass in the receptacle to complete the formation of said neck finish without subjecting the glass in the receptacle to hydraulic pressure.

Signed at Hartford, Connecticut, this 2nd day of January, 1929.

GEORGE E. ROWE.